United States Patent
James et al.

(10) Patent No.: US 6,406,805 B1
(45) Date of Patent: Jun. 18, 2002

(54) METHOD FOR STORING PURGED HYDROGEN FROM A VEHICLE FUEL CELL SYSTEM

(75) Inventors: Brian David James, Alexandria, VA (US); George Steve Saloka, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/421,023

(22) Filed: Oct. 19, 1999

(51) Int. Cl.[7] .............................. H01M 8/04; H01M 8/06
(52) U.S. Cl. ............................................. 429/13; 429/22
(58) Field of Search .............................. 429/13, 17, 19, 429/22

(56) References Cited

U.S. PATENT DOCUMENTS

| | | |
|---|---|---|
| 5,156,925 A | 10/1992 | Lapp |
| 5,429,885 A | 7/1995 | Stockburger et al. |
| 5,478,662 A | 12/1995 | Strasser |
| 5,763,113 A | 6/1998 | Meltser et al. |
| 6,162,556 A * | 12/2000 | Vollmar et al. ............. 429/17 |
| 6,280,865 B1 * | 8/2001 | Eisman et al. ............. 429/17 |

FOREIGN PATENT DOCUMENTS

| | | | |
|---|---|---|---|
| JP | 7-263007 A | * | 10/1995 |
| WO | WO9839250 | | 9/1998 |

* cited by examiner

*Primary Examiner*—Gabrielle Brouillette
*Assistant Examiner*—Jonathan Crepeau
(74) *Attorney, Agent, or Firm*—Damian Porcari

(57) ABSTRACT

A method of operating a fuel cell having an anode passage. The method includes collecting hydrogen from the anode passage that does not pass through the catalyst membrane. The hydrogen, together with water and inert gases, are directed to a hydrogen storage container. The hydrogen storage container includes a hydrogen storage media such as metal hydride, carbon adsorbents, or carbon nanofibers. A sensor determines whether or not the vehicle is moving. When the vehicle is stopped or moving slowly, the surplus hydrogen is directed to the hydrogen storage container for temporary storage. When the sensor determines that the vehicle is moving at a high speed, the surplus hydrogen is vented to atmosphere and the hydrogen storage media is renewed.

5 Claims, 1 Drawing Sheet

METHOD FOR STORING PURGED HYDROGEN FROM A VEHICLE FUEL CELL SYSTEM

BACKGROUND OF THE INVENTION

1. Field of the Invention

The present invention is directed to a method of operating a fuel cell vehicle and storing purged hydrogen in a hydrogen trap. More specifically, the present invention relates to a method of operating a fuel cell vehicle where purged hydrogen is stored to a hydrogen trap at park or slow speed conditions and vented at higher speeds.

2. Discussion of Prior Art

Fuel cells have been identified as a potential energy source for vehicles. Fuel cells operate by converting hydrogen and oxygen into electricity. The hydrogen may come from a stored hydrogen container or may be produced on board the vehicle through a reformer.

Hydrogen is always applied under pressure to the anode side of the fuel cell and is consumed as needed to meet the electrical load placed on the fuel cell. Over time, inert gases (nitrogen, argon, etc.) and water accumulate in the anode passageways to an extent that causes fuel cell performance degradation. Periodic purging of these inert gases and water restores fuel cell performance and is accomplished by venting the anode side to force out the inert gases and water. As a result, some hydrogen is also expelled in the purge cycle.

If the fuel cell anode is not periodically purged of inert gases and water, the efficiency of the fuel cell is greatly reduced. The purged hydrogen is normally expelled either through forcing hydrogen through the anode or by removing the hydrogen through the electrolyte. U.S. Pat. No. 5,156,925, ('925) issued Oct. 20, 1992, teaches a method of purging hydrogen from a fuel cell through liquid electrolyte. The electrolyte dissolves the hydrogen gas and carries the hydrogen gas to an electrolyte storage tank. The electrolyte storage tank receives air. The air causes the hydrogen to de-gas from the electrolyte and become vented to atmosphere. A filter prevents the electrolyte from being carried with the purged hydrogen. The '925 patent does not control the de-gassing or venting of hydrogen. Hydrogen may escape freely from the electrolyte storage container and become vented to atmosphere. This may result in hydrogen being vented from the fuel cell while the vehicle is in a closed environment.

Other patents have also dealt with purged hydrogen gas of a fuel cell. U.S. Pat. No. 5,429,885, ('885) issued Jul. 4, 1995, teaches a method of combining the purged hydrogen gas with oxygen to form water. The invention was intended for use in an underwater vehicle where the hydrogen gas cannot be vented to atmosphere. The '885 patent teaches the use of a catalytic recombiner to combine the hydrogen and oxygen so that the excess hydrogen does not become vented into the vehicle.

U.S. Pat. No. 5,763,113, ('113) issued Jun. 9, 1998, teaches a method of monitoring the operation of a fuel cell to control the venting of purged hydrogen. The '113 patent describes how a build-up of hydrogen, water, and inert gases reduces the efficiency of the fuel cell. The gases and water must be periodically removed to maintain the optimum efficiency of the fuel cell. The hydrogen, other gases and water are periodically purged from the fuel cell using a controller that monitors the operating parameters of the fuel cell stack and compares them to known values. As the efficiency of the fuel cell decreases, the hydrogen, other gases, and water are purged from the system. The '113 patent does not contemplate the unwanted build-up of hydrogen that results from the purging process described. The conditions that lead to a build-up of hydrogen may occur when the vehicle containing the fuel cell is in an enclosed environment.

The present invention anticipates a problem not foreseen in the references described above. The present invention anticipates the venting of hydrogen gas while a vehicle is in an enclosed space. To maintain the efficiency of the fuel cell, the hydrogen is removed from the anode passage, but not immediately vented to atmosphere.

These and other problems of the related art are overcome by the present invention.

SUMMARY OF THE INVENTION

The present invention is directed to a method of operating a fuel cell having an anode passage. The method includes collecting hydrogen from the anode passage that does not pass through the catalyst membrane. The hydrogen, together with water and inert gases, are directed to a hydrogen storage container. The hydrogen storage container includes a hydrogen storage media such as metal hydride, carbon adsorbents, or carbon nanofibers.

A sensor determines whether or not the vehicle is moving. When the vehicle is stopped or moving slowly, the surplus hydrogen is directed to the hydrogen storage container for temporary storage. When the sensor determines that the vehicle is moving at a high speed, the surplus hydrogen is vented to atmosphere and the hydrogen storage media is renewed.

Electrically controlled valves direct the purged hydrogen and renew the hydrogen storage media. The valves are controlled by an electronic controller that monitors vehicle speed and hydrogen build-up within the storage media.

These and other desired objects of the present invention will become more apparent in the course of the following detailed description and the appended claims. The invention may best be understood with reference to the accompanying drawings, wherein illustrative embodiments are shown.

DETAILED DESCRIPTION AND BEST MODE

Figure 1:
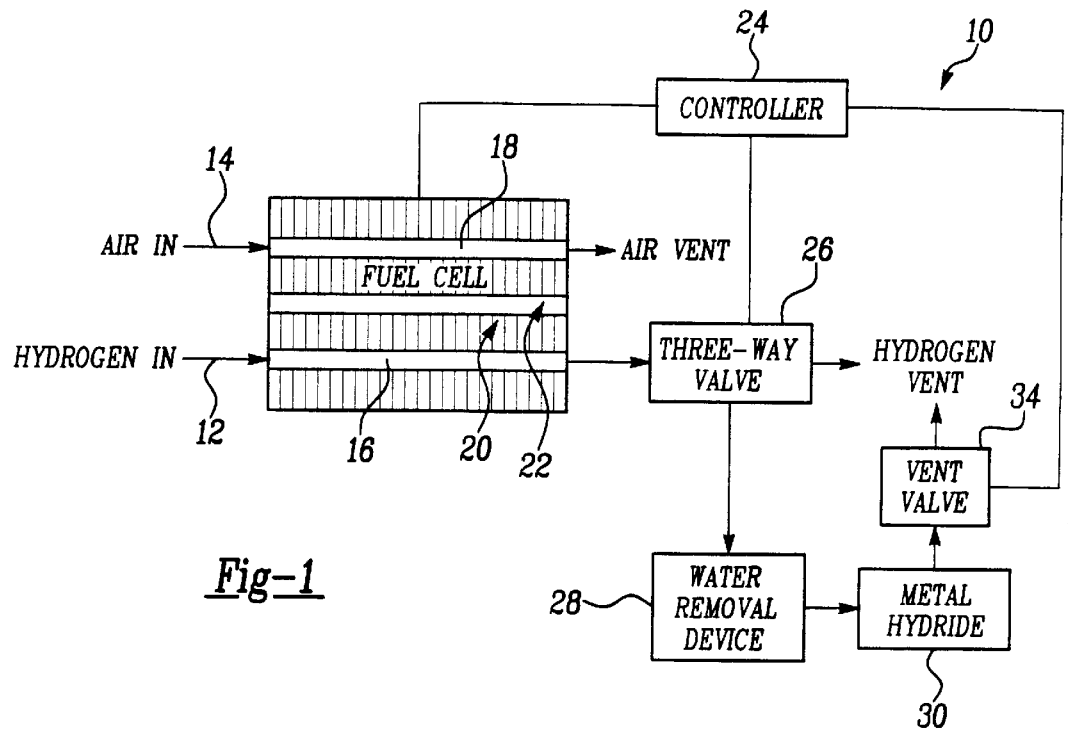
FIG. 1 is a schematic representation of a fuel cell having a hydrogen storage container.

The invention will be illustrated and described as a vehicle having an on-board fuel cell emitting surplus hydrogen. The invention is useful in any situation where unwanted surplus hydrogen is collected and stored until ambient conditions permit its venting. These other devices and methods of operation are included within the invention described herein.

The following items are a word list of the components described in the drawings and are reproduced to aid in understanding the invention:

| | |
|---|---|
| 10 | fuel cell |
| 12 | hydrogen inlet |

-continued

| 14 | air inlet |
| 16 | anode passage |
| 18 | cathode passage |
| 20 | catalyst surface |
| 22 | membrane or separator |
| 24 | controller |
| 26 | 3-way valve |
| 28 | water removal device |
| 30 | hydrogen storage container |
| 32 | hydrogen storage media |
| 34 | vent valve |
| 36 | vehicle speed |
| 38 | comparison |
| 40 | signal |
| 42 | signal |

The invention is intended for use in conjunction with a fuel cell or other device that emits surplus hydrogen during periods of operation that should not be vented to atmosphere. Illustrated in FIG. 1 is a schematic representation of a fuel cell 10. The fuel cell 10 may be any number of fuel cells that convert hydrogen and oxygen into electricity such as proton member exchange, alkaline, or solid oxide fuel cell. The fuel cell 10 receives a stream of relatively pure hydrogen through hydrogen inlet 12 and oxygen through air inlet 14. The hydrogen may be stored on board a vehicle in a hydrogen containment vessel or may, alternatively, be generated from other materials such as gasoline or methanol using a reformer. The oxygen is obtained from the atmosphere. The hydrogen is directed to an anode passage 16 while the oxygen is directed to a cathode passage 18. A catalyst surface 20 converts the molecular hydrogen into hydrogen atoms comprising an electron and a proton. The hydrogen electron becomes part of the electrical circuit and the remaining proton passes through a membrane or separator 22. The proton reacts with the oxygen in cathode passage 18 to form water.

Water condensed from externally humidified hydrogen also collects within the anode passage 16. Other gases, that are contained within the inlet hydrogen, also collect in the anode passage 16. Inert gases and water must be periodically removed or purged from the anode passage 16 to maintain the efficiency of the fuel cell 10.

A variety of methods exist to purge the fuel cell of inert gases and water. The simplest method is merely a periodic purge, by opening the anode to atmosphere. This expels the inert gases and water, along with some hydrogen. Other methods include monitoring the amount of current produced by the fuel cell 10 and estimating the inert gas and water build-up. As a load is applied to a fuel cell, the voltage of the fuel cell will decrease as a function of power. A properly functioning fuel cell will produce a predictable voltage/current polarization curve based on a function of power output. Preferably, the individual cell voltages of a fuel cell will remain equal to the other cell voltages. If one or more cell voltages are lower than the total average cell voltages, a cell may be flooded with water and need to be purged to clear out excess water. Also, if the overall polarization curve indicates a lack of predicted performance, the anode will need to be purged to remove any buildup of inert gases. The problem with this method is that the water buildup occurs so fast that active purge monitor may not purge the anode in time to remove the excess water buildup.

A fuel cell controller 24 controls the operation of the fuel cell 10. When the controller 24 determines that the fuel cell 10 requires purging, the controller 24 signals a three-way valve 26 to move from a closed position to a first position. When the valve 26 is in the first position, the purged hydrogen, other gases, and water are directed to a water removal device 28. The water removal device is a water trap that removes water from the hydrogen stream in either or both of two ways. Firstly, the water removal device causes the gas flow to impinge on multiple surfaces causing entrained water droplets to loose entrainment and accumulate at the bottom of the water removal device. Secondly, the water removal device contains a large surface area which functions as a heat exchange surface to cool the gas stream. As the gas temperature is lowered, water vapor in the gas stream condenses and accumulates at the bottom of the water removal device. Accumulated liquid water is diverted to a storage tank.

The water removal device 28 separates the water from the surplus hydrogen and other gases. The water is drained from the water removal device and the surplus hydrogen and other gases are directed to a hydrogen storage container 30. The hydrogen storage container 30 contains a quantity of hydrogen storage media that adsorbs the surplus hydrogen within the hydrogen storage media. Hydrogen storage media may be any number of devices, including metal hydrides and carbon fiber nanotubes, as described in PCT patent application WO98-39250, incorporated herein by reference.

The operation of a 75 kilowatt fuel cell generally produces as much as five liters of excess hydrogen every two minutes. The storage container 30 should be designed to collect the surplus hydrogen purged from the fuel cell during the fuel cell's operation in a closed environment. Typically, the fuel storage container 30 should be sized to store 20 standard liters of hydrogen. Metal hydrides are typically capable of storing 100 to 800 standard liters per kilogram of metal hydride alloy. The metal hydride alloy is the main component of a metal hydride system that typically consists of a containment canister, hydrogen inlet/outlet port, pressure relief device, and particle filter. An example of a suitable metal hydride system is a model BL-20 canister sold by Hydrogen Components, Inc. Other metal hydrides alloys and systems are also useful for the present invention. For example, metal hydrides alloys and systems manufactured by Ergenics Inc. are suitable when the purged hydrogen includes water. This construction may alleviate the need for the water removal device 28.

The controller 24 monitors the speed of a vehicle containing the fuel cell 10. When the controller senses that the vehicle is operating above a predefined speed, the controller 24 sends a signal to the three-way valve 26 to move to a second position. The second position directs the surplus hydrogen, other gases and water directly to atmosphere. The controller 24 also sends a signal to vent valve 34 to purge the hydrogen storage container 30 of surplus hydrogen.

Metal hydride alloys have predictable hydrogen adsorption/desorption characteristics defined by pressure-concentration-isotherms (PCT data) or Van Hoff plots. Such data defines the concentration plateau pressure at a given temperature at which the metal hydride will either absorb hydrogen or desorb (discharge) it. To purge the metal hydride alloy, the pressure of the metal hydride bed must be reduced below the metal hydrides plateau pressure for that prevailing temperature. To absorb hydrogen, the metal hydride bed must have a pressure higher than the plateau pressure. Thus with proper selection of the metal hydride alloy (i.e. selecting a metal hydride alloy where the plateau pressure is greater than 1 atm at the desired operating temperature), purging may be accomplished by simply venting the metal hydride system to ambient pressure. Cooling of the metal hydride alloy occurs as hydrogen is evolved. Consequently it may be necessary to heat the metal hydride bed to maintain the alloy at a temperature where the plateau pressure is greater than ambient pressure. This may be accomplished by using a simple air fan to blow over the metal hydride cannisters to warm the metal hydride alloy. If greater heating is required, hot air from the fuel cell or other heat source, or other form of heating fluid may be used.

Figure 2:
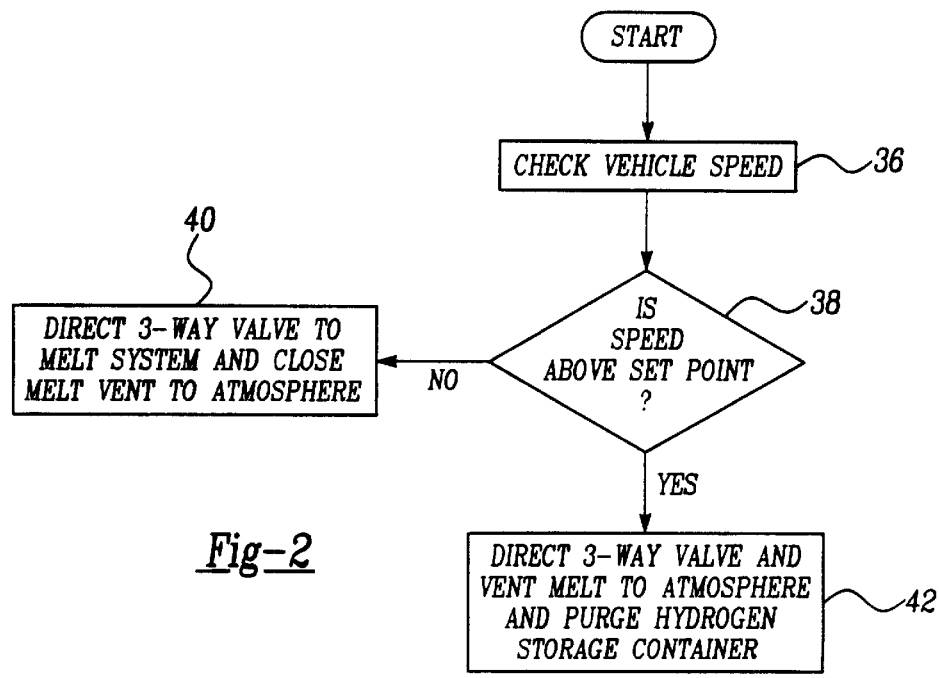
FIG. 2 is a flow chart illustrating the operation of the hydrogen storage container used in the present invention.

The controller 24 is operated by a program that will be described using the flow chart illustrated in FIG. 2. The controller monitors the vehicle speed 36. The vehicle speed 36 is compared to a pre-identified set point in step 38. If the vehicle speed is below the set point, the controller sends a signal 40 to the three-way valve 26. The signal 40 causes the three-way valve 26 to move to a first position and direct the surplus hydrogen, other gases and water to the water removal device 28 and hydrogen storage container 30. The control strategy assumes that hydrogen produced by the fuel cell 10, while the vehicle is at stationary or at very low speeds, should be stored rather than vented to atmosphere to prevent build-up of hydrogen in an enclosed environment. If the comparison step 38 determines that the vehicle speed exceeds the set point, then the controller 24 sends a signal 42 to the three-way valve 26. The signal 42 directs the valve 26 to move to a second position. The second position causes the surplus hydrogen, other gases, and water to be directly vented to the atmosphere. The signal 42 also causes the valve 24 to purge the hydrogen storage container 30. The control strategy assumes that when the vehicle is moving above a predetermined set point, that it is safe to vent the surplus hydrogen and accumulated hydrogen to atmosphere.

While particular embodiments of the invention have been illustrated and described, it will be clear to those skilled in the art that various changes and modifications may be made thereto without departing from the scope of the invention and it is intended to cover in the appended claims all such modifications and equivalents as fall within the true spirit and scope of this invention.

What is claimed:

1. A method of operating a fuel cell having an anode passage, comprising the steps of:

collecting purged hydrogen from said anode passage;

directing said hydrogen to a hydrogen storage media;

purging said media of hydrogen to enable said media to store additional hydrogen; and venting said purged hydrogen to the atmosphere.

2. A method of claim 1, after said collecting step and before said directing step, further comprising the steps of;

directing said hydrogen to a valve;

operating said valve to direct said hydrogen to said hydrogen storage media.

3. The method of claim 2, further comprising the step of monitoring the ambient conditions surrounding said fuel cell to determine if said hydrogen should be directed to said hydrogen storage media.

4. The method of claim 3, wherein said monitoring step measures the speed of a vehicle containing said fuel cell.

5. The method of claim 4, wherein said purging step occurs when said vehicle speed exceeds a predetermined value.

* * * * *